United States Patent [19]

Kapaan

[11] 4,438,987

[45] Mar. 27, 1984

[54] MAGNETIC BEARING SYSTEM

[75] Inventor: Hendrikus J. Kapaan, Ijsselstein, Netherlands

[73] Assignee: SKF Industrial Trading & Development Company B.V., Nieuwegein, Netherlands

[21] Appl. No.: 17,111

[22] Filed: Mar. 5, 1979

[30] Foreign Application Priority Data

Mar. 8, 1978 [NL] Netherlands ................. 7802553

[51] Int. Cl.³ .............................................. F16C 39/00
[52] U.S. Cl. ..................................... 308/10; 250/227; 350/96.20; 356/373
[58] Field of Search .................... 308/10; 324/175; 350/96.20; 356/373, 375; 250/227

[56] References Cited

U.S. PATENT DOCUMENTS

| 3,461,304 | 8/1969 | Genfihr | 250/227 |
|---|---|---|---|
| 3,638,093 | 1/1972 | Ross | 308/10 |
| 3,787,100 | 1/1974 | Habermann | 308/10 |
| 4,037,886 | 7/1977 | Boden | 308/10 |
| 4,190,318 | 2/1980 | Upton | 250/227 |
| 4,240,066 | 12/1980 | Lenox | 250/227 |
| 4,278,323 | 7/1981 | Waldman | 250/227 |
| 4,278,881 | 7/1981 | Mann | 250/227 |

FOREIGN PATENT DOCUMENTS

| 2231447 | 10/1973 | Fed. Rep. of Germany | 308/10 |
|---|---|---|---|
| 2741062 | 3/1979 | Fed. Rep. of Germany | 308/10 |
| 7605725 | 11/1977 | Netherlands | 308/10 |

OTHER PUBLICATIONS

"Optoelectronics Applied to Variable Speed Devices"; Electronic Engineering, 10/74; L. S. Cornish; pp. 18, 19.

*Primary Examiner*—R. Skudy
*Attorney, Agent, or Firm*—Daniel M. Rosen; J. David Dainow

[57] ABSTRACT

In a magnetic bearing system, wherein the gap between relatively moveable elements is controlled by variation of magnetic force therebetween, light is directed from one of the members onto the other member, and reflected back, the reflected light being converted to an electrical signal. The magnetic force between the members is controlled as a direct function of the magnitude of the reflected light. The optical system may include optical fibers for directing the light, and markings may also be provided on the other member to enable determination of relative speed between the members in a further transducing system.

11 Claims, 9 Drawing Figures

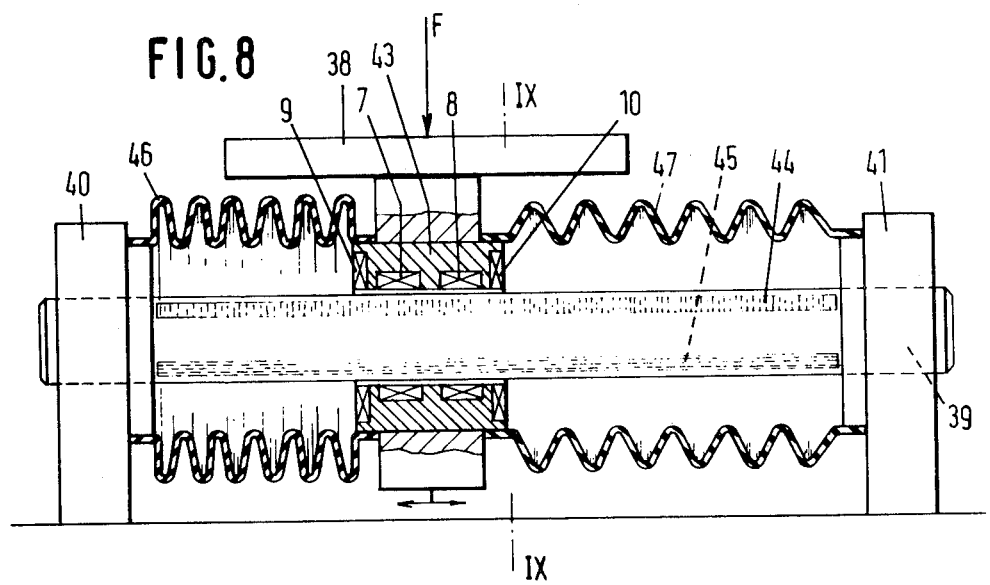
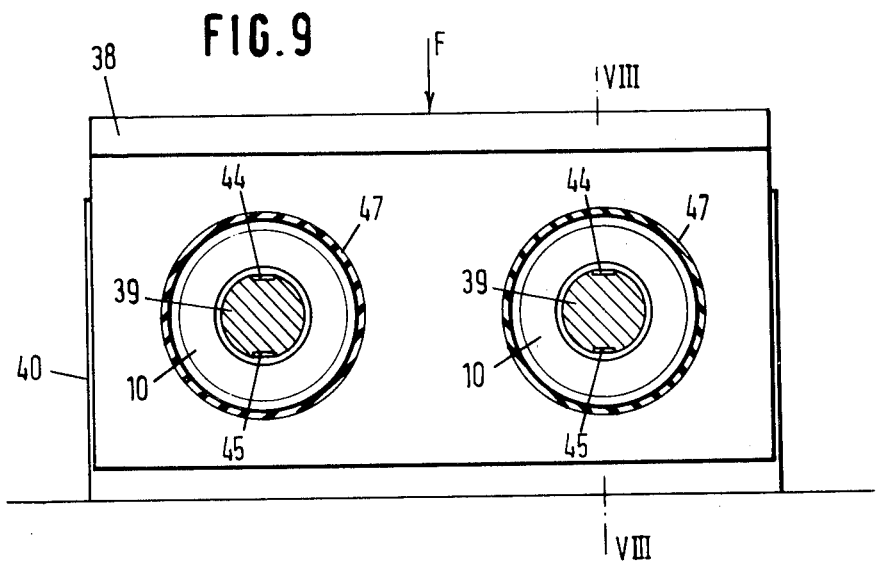

MAGNETIC BEARING SYSTEM

BACKGROUND OF THE INVENTION

The invention relates to a magnetic bearing system provided with electromagnetic means arranged to hold a stationary part, as for example a stator, and a movable part, as for example a rotor, at a distance from each other during operation of the bearing by electromagnetic action, so that the movable part or rotor is movably supported, or rotatable, in relation to the stationary part or stator. The invention relates likewise to a servo system wherein the electromagnetic means are a component part, arranged so as to regulate the electromagnetic action whereby the stationary part or stator and the movable part or rotor are held at a distance from each other such that the clearance between the stationary part or stator and the movable part or rotor remains substantially constant.

The invention thus relates both to bearing systems permitting a rotary motion (rotation) and to bearing systems permitting a displacement (translation). In the following, for the sake of simplicity, the expressions stator and rotor will generally be used, without thereby implying that the embodiments referred to are limited thereto as other types of movable and stationary parts are within the scope of the invention.

Magnetic bearing systems in which there is no mechanical contact between stator and rotor have been developed in the field of space technology. In order to keep the clearance between the stator and rotor substantially constant during operation of the bearing, use is made of electromagnetic sensors that are able to transform variations occurring in the radial distance between the rotor and stator during operation into a corresponding electric control error signal. The control signal permits the electromagnetic means holding the rotor and the stator at a distance from each other by electromagnetic action to be adjusted so that the variation in radial distance is counteracted and a substantially constant air gap can be maintained.

Although such known magnetic bearings provide important technical advantages and possess high service dependability and long service life, the use of electromagnetic sensors is altered by engineering difficulties, while the regulating action is also subject to certain limitations.

An object of the invention is to eliminate the above stated disadvantages inherent in the prior art, while retaining the favorable technical properties and advantages of such prior art devices. In this way it is intended to enhance the versatility of such bearing systems.

SUMMARY OF THE INVENTION

In the above mentioned prior art, the basis of the control effect is that a variation in distance manifests itself as a corresponding variation in the reluctance of a magnetic circuit of a sensor, from which variation in reluctance an electric control signal is derived. The electromagnetic action may then be controlled as a function of the respective variations in distance between the rotor and the stator of the bearing system. The principle of the present invention is to derive such a control signal by electro-optical means. More specifically, a magnetic bearing system according to the invention is characterized by fiber optical means for conveying light rays along separate paths between the stationary part or stator and the movable part or rotor of the bearing system. Advantageously, such fiber optical means may take the form of a plurality of separate optical fibers, each arranged for two-way light transmission, each such fiber being threaded through a passage provided for it in the respective bearing part, as for example the stator or the rotor. Thus it is possible in a simple and reliable manner, at several locations, to pick up variations occurring during operation of a bearing system in the clearance between the part or rotor and the stationary part or stator, and involve them in a control process whereby such clearance, more specifically the radial and/or axial distance between the movable part or rotor and stationary part or stator of the bearing system may be kept constant. It will be clear that although the expressions rotor and stator are used in the following, the invention is also applicable to bearing systems in which one part is mounted displaceably relative to another part so that a relative rectilinear motion between the parts is possible.

The optical fibers are preferably arranged so that the light transmitted into the interval between rotor and stator of a bearing system, in the form of a number of beams of light equal to the number of fibers used, falls perpendicularly on the surface of the bearing part from which the light is reflected back to the transmitting fiber. To promote such reflection, as well as to minimize the quantity of light to be supplied, it is advantageous for the particular area of the bearing system where the reflection is to occur to be provided with a highly reflective surface which may for example be accomplished by having the respective peripheral portion of the bearing part made of a metal with a high polish.

To produce a bearing part, for example the stator, having a plurality of through passages of small cross section to accommodate the optical fibers, use may advantageously be made of a process as disclosed in the previously filed Netherlands Patent Application No. 7605725 wherein iron powder with rod-shaped elements of copper or other suitable material arranged in the regions where the passages are required is isostatically compacted into the desired shape of the bearing part, whereafter the copper diffuses into the compacted member when sintered. In this way it is possible to form passages of small cross section and any desired shape in the respective bearing part.

Since, according to the invention, the clearance between the movable part or rotor and the stationary part or stator of the magnetic bearing system is monitored on the basis of quantity of reflected light radiation received by thin optical fibers, the invention offers an opportunity to improve on servo systems for controlling the electromagnetic action between the stator and rotor of a magnetic bearing system whereby the stator and rotor may be kept at a constant distance from each other, irrespective of smallness in size of the bearing system. Because use is made of optical fibers, the source of light serving to transmit light rays through the gap between the rotor and the stator may be conveniently located as may be the electro-optical transducer means optically coupled to the optical fibers to receive the light transmitted by the source and reflected across the gap. The electro-optical transducer means transform the received light into an electric control signal for controlling the electromagnetic action between the rotor and stator in response to variations in the distance between the rotor and the stator. In addition to control of radial distance and/or axial distance in the gap between the rotor and stator parts of a bearing system, attitude control is also possible for maintaining a desired tilt of the rotor relative to the stator. Such control can be achieved provided at least two optical fibers are coupled to the space between rotor and stator at two locations situated on a line parallel to the longitudinal axis of the bearing and the electro-optical transducer means are included in a control system operating to keep the axially facing surfaces of the rotor and stator parts substantially parallel to each other.

It is likewise possible according to the invention, in an embodiment of simple design, an accurately control speed of movement if a pattern of markings for tachmeter signals is provided along a peripheral portion of the rotor and the stator contains one or more optical fibers optically coupled to the gap between the rotor and stator matching the peripheral portion, the optical fibers being optically coupled first to a source of light to transmit light into the gap and then to electro-optical transducer means of a servo system of the type described above.

The invention may advantageously be applied also to a bearing system in which one part can execute a translation relative to the other. It is thus possible, for example, to provide a pattern of speed control markings in the form of an axial stripe on the stationary part and a corresponding optical fiber arranged in the movable part to match the stripe to derive a control signal dependent on speed. The control signal causes active magnets of the movable part to be energized so as to obtain a gradual reduction in speed when the movable part is approaching an extreme position, and the latter can thus be gradually brought to a stop without violent collision with an arresting member.

The invention may advantageously be employed in combination with an electric motor, where a magnetic bearing system according to the invention operates both in the radial direction and in an axial direction and is detachably coupled to the stator and/or the rotor of the electric motor. According to a further feature of the invention, the bearing system has the advantage of utilizing the fan effect generated by the electric motor as a means of blowing dust and other foreign matter out of the space between the stator and rotor of the magnetic bearing system so as to maintain optimum control.

Other and further objects and advantages of the invention will be appreciated from the following drawings and description of several preferred embodiments in which like reference numerals are used to indicate like parts in the various views.

DESCRIPTION OF THE DRAWINGS

FIG. 8 is a longitudinal section, at the line VIII—VIII in FIG. 9, of an embodiment of a bearing system according to the invention in which one part can execute a linear motion relative to a stationary part, and experiences an electromagnetic buffer effect upon approaching an extreme position; and FIG. 9 is a cross section at the line IX—IX in FIG. 8.

DESCRIPTION OF THE PREFERRED EMBODIMENTS

Figure 1:
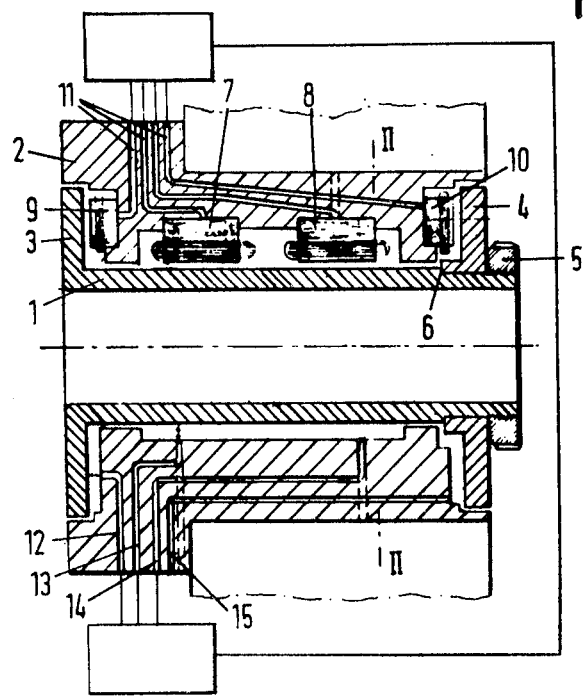
FIG. 1 is a longitudinal section of an embodiment of a magnetic bearing system according to the invention.

The magnetic bearing system according to the invention as represented in FIG. 1 operates in both radial and axial directions. The bearing system comprises a rotor 1 and a stator 2. The rotor is here made in the form of a hollow shaft provided at one end with a flange 3 fixed thereto and at the other end with a removable flange 4 capable of being pressed, by means of a nut 5, against a shoulder 6 formed on the outer surface of the rotor 1. The stator 2 is a hollow, substantially cylindrical member, circumscribing the rotor. On the internal surface of the stator 2 facing the cylindrical outer surface of the rotor 1, electromagnets such as 7 and 8 are evenly distributed over the circumference. As further illustrated in FIG. 2, the magnet 8 with associated magnets 8', 8" and 8''' arranged in the same plane and the rotor part 1 form an air gap, which, when said electromagnets are energized, can be maintained with the rotor rotatably supported relative to the stator. In addition to radially active electromagnets, the magnetic bearing system is provided also with axially operative magnets 9 and 10, also arranged circumferentially at equal intervals. Between the magnets 9 and 10 and the flanges 3 and 4 of the rotor air gaps are contained are respective air gaps which can be maintained when the magnets 9 and 10 are energized. To energize the magnets, passages such as at 11 are provided in the stator, through which there are threaded electric conductors, which are included under reference numeral 11, connected to the respective magnets for energizing them.

Figure 2:
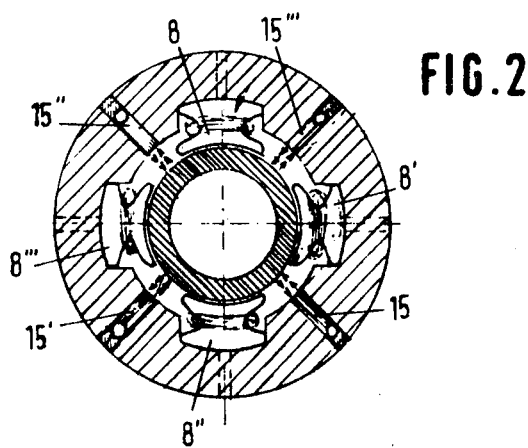
FIG. 2 is a cross section at the line II—II in FIG. 1.

Further, passages such as at 12, 13, 14 and 15 are formed in the stator 2. FIG. 2 more clearly indicates how passages 12, 13, 14 and 15 are radially situated with corresponding coplanar passages at equal circumferential intervals. FIG. 2 shows passages 15, 15', 15", 15'''. Passages 12, 13, and 14 each having three corresponding coplanar passages at 90° intervals (not shown). Through each of the passages such as 12, 13, 14, 15, an optical fiber is threaded, each of said optical fibers being arranged for two-way transmission of light. In this way it is possible, by way of one of the channels in each of the optical fibers, to transmit light from a source located outside the bearing system into the space between the stator 2 and rotor 1. That is, a beam of light can be transmitted from the point at which the light transmitting optical fiber terminates at the gap between the rotor 1 and stator 2 to the facing surface portion of the rotor 1. This light is reflected by the rotor and received by the same optical fiber, whereupon the reflected light thus received can be conducted back by way of another channel of the same optical fiber to a point outside the magnetic bearing system where the reflected radiation can be received.

Figure 3:
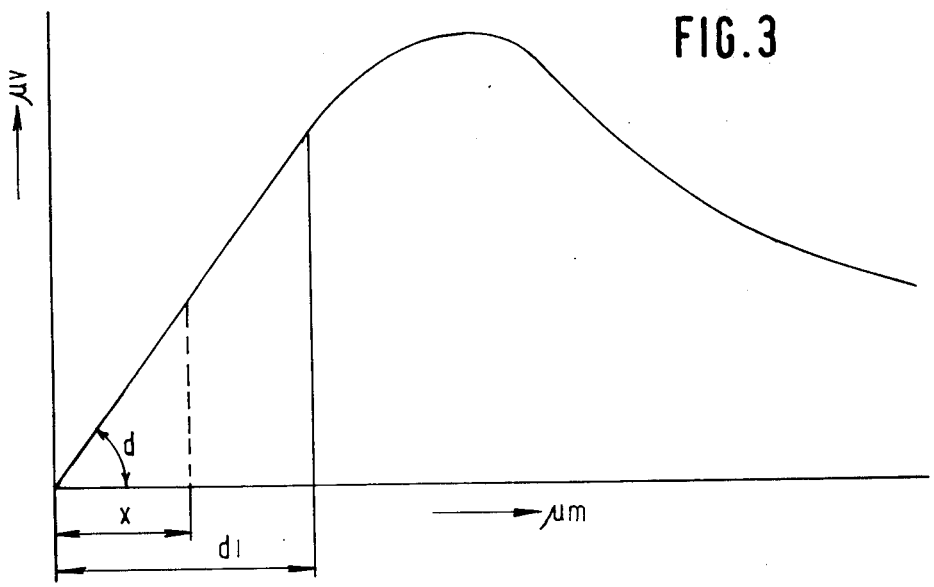
FIG. 3 is a graph showing electric potential as a function of a distance between two parts, for use in describing the operation of the bearing system according to FIGS. 1 and 2.

In this way it is possible to detect the clearance between the rotor 1 and the stator 2 in several locations, any variations in the distance between the rotor 1 and the stator 2 of the bearing system resulting in a corresponding variation of the locally reflected light, which variation in reflected light may then be utilized for control purposes. The light received on reflection by an optical fiber and conducted outside the bearing system may for example be received or sensed by an electro-optical transducer capable of transforming the light radiation received into a corresponding electric signal. By way of illustration, FIG. 3 shows a graph of the magnitude of such an electric signal as a function of the rotor to stator distance existing at the radial location where an optical fiber is coupled to the space gap, i.e. between the rotor 1 and stator 2 of the bearing. In FIG. 2, the beams of light conducted toward the rotor by an optical fiber and the beams of light reflected from the rotor art are schematically represented by lines with arrowheads.

In FIG. 3, the abscissas are distances d in microns, while the ordinates are voltages in microvolts. The substantially linear portion (indicated by d1) of the voltage curve shown in FIG. 3 is useful for purposes of the invention. The angle α indicated in FIG. 3 between the said substantially linear portion and the horizontal axis, which is a measure of the sensitivity of the distance measuring system, depends on the form and design of the optical fiber used to conduct the light radiation. The operating point (indicated by x) is preferably so chosen that the maximum variation in distance d to be expected in either the positive or negative direction results in the same magnitude of variation in voltage. Depending on the optical fibers used, the horizontal coordinate determining the point of operation may for example range from 10 to 600 microns. FIG. 3 shows that upon an increase (decrease) in the distance between stator 2 and rotor 1 at the location where the optical fiber in question is optically coupled to the gap, the quantity of reflected light received by the fiber in question becomes greater (less), which results in an increase (decrease) in the voltage generated by the electro-optical transducer optically coupled to the optical fiber in question.

The stator 2 described with reference to FIGS. 1 and 2, with passages therein accommodating the respective optical fibers and the electric conductors to energize the electromagnets, may advantageously be produced by a known process, as described in Netherlands Patent Application No. 7605725. According to this earlier specification, the starting material is iron powder, in which as many elongated copper elements as these are passages required are introduced at the locations where the passages are required. Such a body of iron powder with copper elements arranged therein is then isostatically compacted into the desired final shape, after which th whole is sintered so that it remains in the mold. The passages are hollowed out in the desired manner since during the sintering operation, the copper elements undergo dissolution and infiltrate the pores of the product, thus finally leaving a hollow passage with a supersaturated wall.

To increase the reflecting power as well as to minimize the quantity of light to be transmitted, it is advisable to further render those peripheral portions of the rotor 1 of the magnetic bearing system which are to cooperate with the optical fibers highly reflective to light, which may for example be accomplished by forming the rotor from metal with a highly polished finish at the reflecting circumference. Alternatively, the peripheral portions in question may be provided with a vapor-condensed layer of reflective metal.

Figure 4:
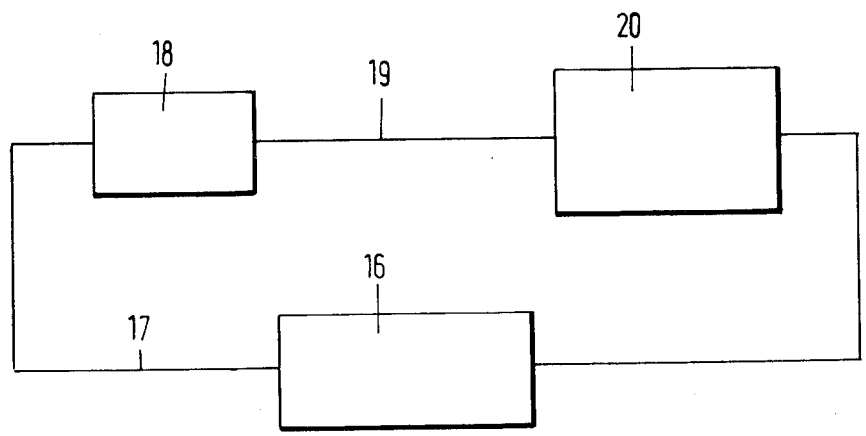
FIG. 4 is a diagram of a servo system in which a magnetic bearing system according to the invention may be incorporated.

FIG. 4 shows a diagram of a servo system in which a magnetic bearing system according to the present invention may be incorporated. Here 16 schematically indicates a magnetic bearing system according to the invention. The output of an optical fiber by way of which reflected light is received from the rotor 1 and transmitted is connected by an optical transmission line 17, suitable for transmitting, light to an electro-optical transducer 18 capable of transforming an optical signal supplied thereto into a corresponding electric signal. This transducer is connected by an electrical line 19 to a controllable drive unit 20 arranged, on the basis of an electric control signal presented by way of the line 19, to deliver a corresponding energizing current to or respective set of electromagnets such as, for example, electromagnets 8, 8', 8" and 8''' as represented in FIG. 2. Such a controllable drive unit is of a known type to the art and is so arranged that in response to a control signal supplied thereto by way of line 19 from transducer 18, an energizing current is delivered to the subject magnets that operates against the perceived variation in distance between the rotor 1 and the stator 2. In this manner a servo mechanism operates in respond to a control signal generated by way of the optical fiber to counteract a perceived variation in distance so that a substantially constant distance between the rotor 1 and the stator 2 of the bearing system is maintained. Thus it is possible to compensate distance variations in a radial direction and/or in an axial direction between the rotor 1 and the stator 2. Furthermore, it is possible to counteract a tendency of the rotor to assume an oblique attitude (tilting) relative to the stator, namely by means of pairs of optical fibers such as 13 and 14 (FIG. 1) optically coupled to the space between the stator and the rotor at two locations situated on a line parallel to the longitudinal axis of the bearing and operating in combination in a servo system like that described above with reference to FIG. 4, whereby a tendency of the rotor to tilt can be compensated.

In principle, it is possible to use one and the same source of light for several optical fibers disposed in different places to monitor the distance between the rotor an stator of a magnetic bearing system. Such a source of light may be optically coupled by simple means to several optical fibers so that light is transmitted to the various locations in the space between the rotor and stator, the output extremities of the optical fibers being then optically coupled by way of separate optical transmission lines to a corresponding electro-optical transducer.

Figure 5:
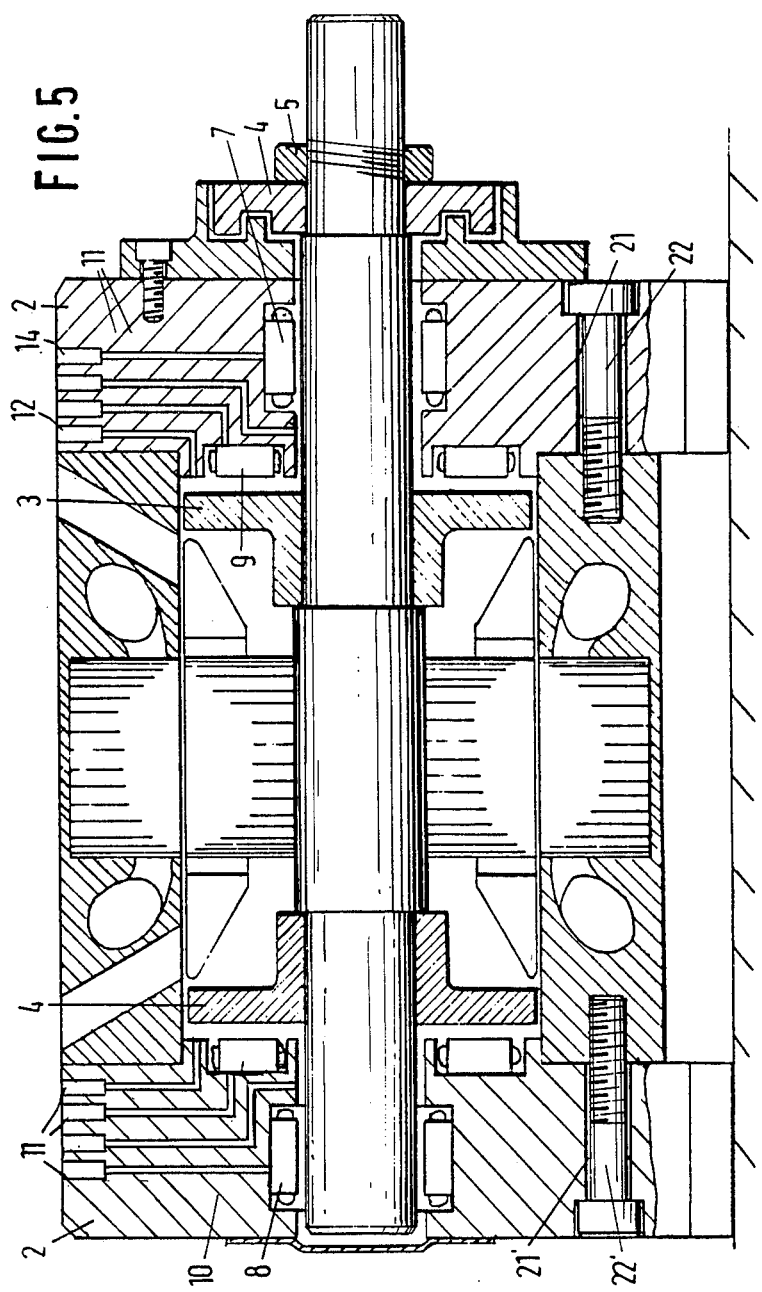
FIG. 5 is a longitudinal section of an electric motor provided with two magnetic bearing systems according to the invention.

FIG. 5 shows a longitudinal section of an electric motor in which two magnetic bearing systems according to the invention are employed. Each of these magnetic bearing systems is substantially similar to the embodiment shown by way of example in FIGS. 1 and 2, with the difference that a magnetic bearing system as used in the embodiment of FIG. 5 comprises only a set of magnets for radial action and one set of magnets for axial action in one direction. Corresponding parts of the embodiment according to FIG. 5 are indicated by the same reference symbols as in FIG. 1. For each of the bearing systems, the rotor part is integral with the shaft of the armature of the electric motor. The stator of the respective magnetic bearing system is provided with coupling means whereby the bearing system, more specifically the stator, is coupled to the stator of the motor. For this purpose, the bearing stator is provided with peripherally arranged openings through which fastening bolts can be passed so that the bearing stator may be fastened to the stator housing of the motor. In FIG. 5, for each bearing system only one of the openings 21, 21' and a corresponding fastening bolt 22, 22' are shown.

Figure 6:
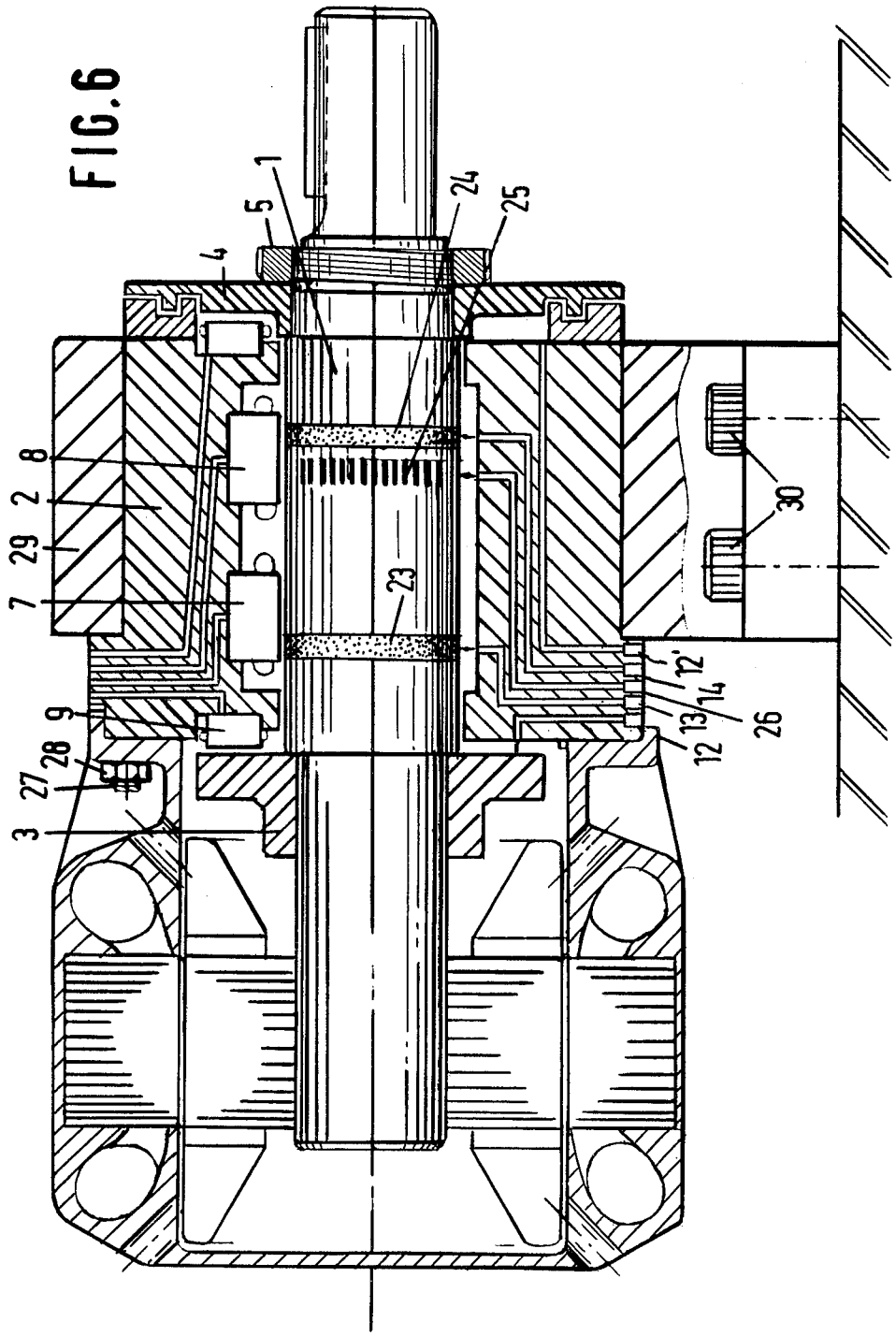
FIG. 6 is a longitudinal section of an electric motor equipped with a magnetic bearing system according to the invention.

FIG. 6 shows an alternative example of an application of a magnetic bearing system according to the invention, more specifically a bearing system of the kind shown in and described with reference to FIGS. 1 and 2. Where the same elements are concerned, FIGS. 1 and 2 on the one hand and FIG. 6 on the other hand employ the same reference symbols. In the embodiment of FIG. 6 the rotor 1 of the bearing system is also fixed to the shaft of the armature of the electric motor. The flange 3 is here fixed to the shaft by means of a forced connection or fit. The peripheral portions 23 and 24 of the rotor 1 facing the extremities of the optical fibers 13 and 14 are rendered reflective to light, for example, by using a polished chrome-silver plated ring. Further, the peripheral portion of the rotor 1 is also provided with a pattern of markings serving for tachometer signaling, which pattern is schematically indicated at 25. Optically coupled to the gap at the location of this pattern is an optical fiber 26, also arranged for two-way transmission of light. By optically coupling an optical fiber such as 26 to a source of light and to an electro-optical transducer, with the cooperation of the revolving pattern of markings and the optical fiber 26 optically coupled to the dynamic image thereby formed, an electric control signal can be derived from which the speed of the rotor 1 can be controlled during operation.

As in the embodiment of FIG. 5, the stator 2 of the magnetic bearing system is detachably coupled to the stator of the electric motor, namely by means of a bolt-and-nut connection 27, 28 of which FIG. 6 shows one set only. The assembly composed of the electric motor and magnetic bearing system is supported in the embodiment of FIG. 6 by an annular frame 29 detachably mounted via bolts 30 on a baseplate.

Figure 7:
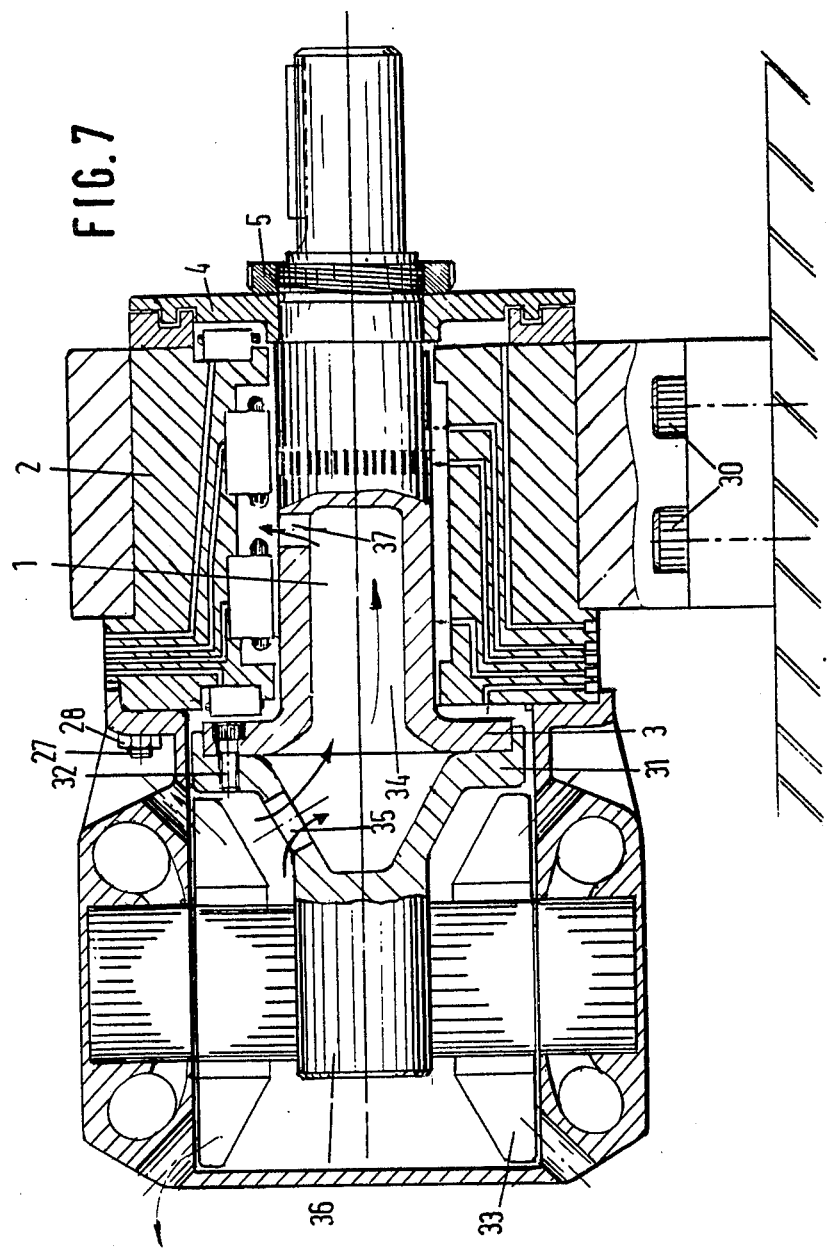
FIG. 7 is a longitudinal section of an alternative embodiment of an electric motor detachably coupled to a magnetic bearing system according to the invention.

FIG. 7 shows an alternative embodiment of an assembly of an electric motor and a magnetic bearing system according to the invention. The embodiment of FIG. 7 is largely similar to the embodiment of FIG. 6. Where similar parts occur in these figures, the same reference symbols have been used. The principal difference between the embodiment of FIG. 6 and the embodiment of FIG. 7 is that in the embodiment of FIG. 7, the rotor of the magnetic bearing is detachably coupled to the armature shaft of the electric motor. For this purpose, the shaft of the electric motor is provided at the end towards the magnetic bearing system with a flange 31 detachably coupled by means of fastening bolts 32 to the flange 3 of the rotor of the magnetic bearing system. Much as was the case in the embodiment of FIG. 6, the stator 2 of the magnetic bearing system is detachably coupled to the stator of the electric motor (bolt-and-nut connections 27, 28).

According to a further special feature of the embodiment according to FIG. 7, use may advantageously be made of the operation of a fan 33 normally already present and mounted on the armature of the motor. In the embodiment of FIG. 7, there is created a current of air between the motor space where the fan operates and the space between the rotor 1 and stator 2 of the magnetic bearing system, so that the blast generated by the fan can be utilized to also keep the space free from dirt and foreign matter. For this purpose, the end of the rotor 1 of the magnetic bearing system facing the motor shaft is made hollow, the cavity 34 being in communication by way of one or more openings 35 provided in the connecting part between the rotor flange 31 and the rotor armature shaft 36 with the interior of the motor where the fan 33 is operative. Further, the cavity 34 is connected by way of one or more openings 37 with the space between the rotor 1 and the stator 2 of the magnetic bearing system, so that a current of air set up by the fan 33 may also exert a cleaning action with respect to said space.

Obviously, numerous other embodiments and modifications of the embodiments described in the foregoing by way of example can be created by those skilled in the art without departing from the spirit of the invention.

For example, FIG. 8 shows an embodiment of a magnetic bearing system according to the invention in which one part 38 is capable of executing a linear motion relative to a stationary part 39 fixed at both ends to the supporting members 40 and 41 of a frame 42. The part 38 is fixed to an annular member 43 in which, much as in the embodiments previously described, there are arranged electromagnets 7 and 8 operative in a radial direction, electromagnets 9 and 10 operative in an axial direction, corresponding energizing conductors (not shown), and optical fibers (not shown). The magnets 7 and 8 operate in the same manner as previously described to keep the radial distance between the annular member 43 and the stationary rod-shaped member 39 substantially constant under the control of the mechanism previously described as effected by the respective optical fibers when the part 38 is moved in one direction or the other and/or experiences a radial load F. In connection with this control effect, axial stripes 44 of high light-reflecting power are formed along the outer periphery of the stationary part 39. Likewise formed along the periphery of the stationary part 39 is an axial stripe 45 with a pattern of markings comparable to the pattern of markings described for the embodiment of FIG. 6 to obtain a speed control. In the embodiment of FIG. 8, an optical fiber (not shown) arranged in the annular member 43 is optically coupled to this pattern of markings. The arrangement here is such that the control signal supplied by this optical fiber is directly proportional to the speed of progress of part 38, the axially operative magnets 9 and 10 being energized in accordance with said control signal. The result is a buffer effect in terms of speed, so that part 38 will gradually come to a stop as it approaches an extreme position, and not collide with an arresting member by violent impact. The spring bellows indicated by 46 and 47 in FIG. 8 are intended merely to keep the zone of operation of the electromagnets free from dust and dirt particles.

I claim:

1. A magnetic bearing system comprising a first bearing member, a second bearing member movable relative to said first member, and adjusting means for maintaining a distance between said first and second members substantially constant, said adjusting means including means for transmitting light from one of said members to a surface of the other of said members, means for receiving a portion of said light reflected by said surface, and electromagnetic means electrically connected to said receiving means for exerting an electromagnetic force between said members variable as a function of the magnitude of the light received by said receiving means, at least one of said transmitting means and receiving means including a light conducting optical fiber.

2. Apparatus according to claim 1 wherein the surface of said other member to which the light is transmitted is highly polished to ensure reflectance.

3. Apparatus according to claim 2 wherein said surface region is formed from a highly polished metal.

4. Apparatus according to claim 1 wherein each of the receiving means and transmitting means includes a light conducting optical fiber comprising a respective channel of a two way light conducting set of optical fibers.

5. Apparatus according to claim 4 wherein said transmitting means and receiving means each comprise a plurality of optical fiber sets spaced apart from one another.

6. Apparatus according to claim 5 wherein at least some of said optical fiber sets are in a common plane normal to the axis of said bearing system.

7. Apparatus according to claim 5 wherein at least two of said optical fiber sets are disposed along a common line parallel to the axis of said bearing system.

8. Apparatus according to claim 1 wherein said second bearing member is rotatable relative to said bearing first member.

9. A magnetic bearing system comprising a first bearing member, a second bearing member movable relative to said first member, and adjusting means for maintaining a distance between said first and second members substantially constant, said adjusting means including means for transmitting light from one of said members to a surface of the other of said members, means for receiving a portion of said light reflected by said surface, and electromagnetic means electrically connected to said receiving means for exerting an electromagnetic force between said members variable as a function of the magnitude of the light received by said receiving means, said other member having a further surface from which said transmitted light is reflected, tachometer markings on said further surface, said receiving means including means responsive to light reflections affected by said tachometer markings for generating a signal indicative of speed of relative movement between said first and second members.

10. Apparatus according to claim 9 wherein said tachometer markings include an axial stripe.

11. A servo system for regulating electromagnetic action wherein the stationary part and the movable part of a magnetic bearing system are maintained at a distance from each other, said magnetic bearing system including a movable part, electromagnetic means holding the stationary part and the movable part at a distance from each other by electromagnetic action, said movable part being thereby movably supported relative to said stationary part, and fiber optic means for conducting light radiation along separate paths to and from a gap, defining a clearance, between said stationary part and said movable part, the light reflected from said gap being a measure of said clearance, a source of light optically coupled to an input end of the fiber optical means, electro-optical transducer means optically coupled to an output end of the fiber optical means to transform light transmitted in from the source and reflected out of said gap into an electrical control signal, and means for varying the electromagnetic effect as a direct function of variations in said electrical control signal.

* * * * *

UNITED STATES PATENT AND TRADEMARK OFFICE
CERTIFICATE OF CORRECTION

PATENT NO. : 4,438,987
DATED : March 27, 1984
INVENTOR(S) : Hendrikus J. Kapaan

It is certified that error appears in the above–identified patent and that said Letters Patent are hereby corrected as shown below:

In col. 1, line 59, delete "the";
    col. 2, line 9, insert --movable-- before "part";
    col. 3, line 12, insert --to obtain-- after "design", and change "control" to --controlled--;
        line 13, change "tachme" to --tachome--;
        line 29, insert --the axially-- after "causes";
    col. 4, line 31, insert --the-- before "radially";
        line 36, delete "air gaps are contained";
        line 48, change "having" to --have--;
        line 62, change "an other" to --another--;
    col. 5, line 12, change "space gap, i.e." to --gap, i.e. space--;
        line 15, change "art" to --part--;
        line 48, change "these" to --there--;
        line 52, change "th" to --the--;
    col. 6, line 5, insert a comma after "fiber";
        line 7, insert a comma after "transmitted";
        line 8, delete comma after "transmitting and insert a comma after "light";

UNITED STATES PATENT AND TRADEMARK OFFICE
CERTIFICATE OF CORRECTION

PATENT NO. : 4,438,987
DATED : March 27, 1984
INVENTOR(S) : Hendrikus J. Kapaan

It is certified that error appears in the above–identified patent and that said Letters Patent are hereby corrected as shown below:

```
           line 14, change "or" to --the--;
           line 23, change "respond" to --response--;
           line 43, change "an" to --and--;
 col. 9,   line 22, insert --first-- after "said";
           line 23, delete "first".
```

Signed and Sealed this

*Fourteenth* Day of *May 1985*

[SEAL]

*Attest:*

DONALD J. QUIGG

*Attesting Officer*  *Acting Commissioner of Patents and Trademarks*